(12) United States Patent
Palazzolo et al.

(10) Patent No.: US 7,877,635 B2
(45) Date of Patent: Jan. 25, 2011

(54) AUTONOMOUS DIAGNOSIS AND REPAIR OF STORAGE COMPONENTS

(75) Inventors: Aaron S. Palazzolo, Tucson, AZ (US); Noah J. Sellars, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/972,464

(22) Filed: Jan. 10, 2008

(65) Prior Publication Data

US 2009/0183025 A1 Jul. 16, 2009

(51) Int. Cl.
G06F 11/00 (2006.01)

(52) U.S. Cl. .......................................... 714/26; 714/25

(58) Field of Classification Search .................. 714/26
See application file for complete search history.

(56) References Cited

U.S. PATENT DOCUMENTS

| | | | |
|---|---|---|---|
| 4,108,360 A * | 8/1978 | Beismann et al. ............. 714/45 |
| 5,790,773 A * | 8/1998 | DeKoning et al. ............. 714/6 |
| 6,751,681 B2 | 6/2004 | Torii et al. |
| 7,136,768 B1 | 11/2006 | Shah et al. |
| 7,203,723 B2 | 4/2007 | Ogawa |
| 7,260,628 B2 * | 8/2007 | Yamamoto et al. .......... 709/224 |
| 7,596,616 B2 * | 9/2009 | Yamamoto et al. .......... 709/224 |
| 2002/0138567 A1 * | 9/2002 | Ogawa ....................... 709/203 |
| 2004/0260984 A1 | 12/2004 | Lee |
| 2005/0120112 A1 * | 6/2005 | Wing et al. .................. 709/224 |
| 2007/0271377 A1 * | 11/2007 | Yamamoto et al. .......... 709/224 |
| 2007/0277167 A1 * | 11/2007 | Smith et al. .................. 717/168 |
| 2008/0147789 A1 * | 6/2008 | Wing et al. .................. 709/203 |
| 2008/0307407 A1 * | 12/2008 | Wagner et al. ............... 717/172 |
| 2009/0013208 A1 * | 1/2009 | DiMuzio ........................ 714/2 |

* cited by examiner

*Primary Examiner*—Scott T Baderman
*Assistant Examiner*—Kamini Patel
(74) *Attorney, Agent, or Firm*—Griffiths & Seaton PLLC

(57) ABSTRACT

A method for the autonomous diagnosis and repair of user-configured storage subsystem components in a storage environment is provided. The method includes monitoring the user-configured storage subsystem components to identify an error associated with a first component of the user-configured storage subsystem components, the error corresponding to an error code, cross referencing the error code against a severity matrix, querying a depot for a fix code, and downloading and applying the fix code if the first component is configured, according to the severity matrix, to be autonomously repaired.

18 Claims, 15 Drawing Sheets

| STORAGE SUBSYSTEM | AUTHORITY | SUBSYSTEM COMPONENT | ERROR CODE | SEVERITY |
|---|---|---|---|---|
| DISK ARRAY | NOTIFY | CONTROLLER | co98 | 2 |
| DISK ARRAY | ACTION | DISK DRIVE | tr45 | 3 |
| DISK ARRAY | ACTION | DISK DRIVE | rew5 | 1 |
| DISK ARRAY | NOTIFY | ESM | es52 | 3 |
| TAPE LIBRARY | ACTION | PICKER | yy78 | 3 |
| TAPE LIBRARY | NOTIFY | ROBOT | 1234 | 4 |
| TAPE LIBRARY | ACTION | TAPE DRIVE | 2345 | 2 |
| TAPE LIBRARY | ACTION | TAPE DRIVE | 4765 | 4 |

| FREQUENCY OF OCCURRENCE | ACTION |
|---|---|
| ONCE PER 5 MINS | UPDATE |
| ONCE PER 5 MINS | UPDATE |
| ONCE PER 5 MINS | UPDATE |
| ONCE PER 1 HOURS | UPDATE IF FREQUENCY EXCEEDED |
| ONCE PER 4 HOURS | UPDATE IF FREQUENCY EXCEEDED |
| ONCE PER 24 HOURS | UPDATE IF FREQUENCY EXCEEDED |
| ONCE PER 5 MINS | UPDATE |
| ONCE PER WEEK | UPDATE IF FREQUENCY EXCEEDED |

Fig. 3

SEVERITY ACTION

STORAGE SUBSYSTEM | SUBSYSTEM COMPONENT | SEVERITY | ACTION
DISK ARRAY ▼ | CONTROLLER ▼ | 2 ▼ | UPDATE ▼
UPDATE
UPDATE IF FREQUENCY EXCEEDED — 112

FREQUENCY ACTION

FREQUENCY OF OCCURENCE   ACTION

| ONCE PER 5 MINS ▼ | UPDATE ▼ |
| --- | --- |
| ONCE PER 1 HOURS | |
| ONCE PER 24 HOURS | |
| ONCE PER 4 HOURS | ⌐116 |
| ONCE PER 5 MINS | |
| ONCE PER WEEK | |

ERROR CODES

STORAGE SUBSYSTEM  SUBSYSTEM COMPONENT  ERROR CODE

DISK ARRAY ▼  CONTROLLER ▼  co98 ▼

DISK ARRAY
TAPE LIBRARY  ~130

AUTONOMOUS DIAGNOSIS AND REPAIR OF STORAGE COMPONENTS

BACKGROUND OF THE INVENTION

1. Field of the Invention

The present invention relates in general to computers, and more particularly to a system and method for autonomously diagnosing, addressing, and repairing severe and/or high frequency failures in storage components.

2. Description of the Prior Art

Data storage systems, disk or tape, are utilized to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data.

Generally, if an error occurs somewhere in the storage environment, an entry is recorded in a particular type of historical record or log. The end user responsible for the storage unit may review the logs at some time after the error event has occurred. In some cases, a significant amount of time may pass between the error event and the time that the end user reviews the error record. The end user may then determine what action to take to address the error. The user may ignore the error, repair the error herself, call for service from a responsible vendor, or request an additional vendor address the error. For many storage environment errors, the resulting repair action is an upgrade in microcode associated with the particular storage component.

SUMMARY OF THE INVENTION

Since many errors may be corrected through a microcode upgrade to the storage component, such upgrades may be autonomously provided by the storage environment itself. A need exists for such a system and method for the autonomous diagnosis and repair of storage components in a storage environment. Accordingly, in one embodiment, by way of example only, a method for the autonomous diagnosis and repair of user-configured storage subsystem components in a storage environment is provided. The method includes monitoring the user-configured storage subsystem components to identify an error associated with a first component of the user-configured storage subsystem components, the error corresponding to an error code, cross referencing the error code against a severity matrix, querying a depot for a fix code, and downloading and applying the fix code if the first component is configured, according to the severity matrix, to be autonomously repaired.

In another embodiment, again by way of example only, a system for the autonomous diagnosis and repair of user-configured storage subsystem components in a storage environment includes a controller coupled to a first component of the user-configured storage subsystem components. The controller is configured to monitor the user-configured storage subsystem components to identify an error associated with the first component, the error corresponding to an error code, cross reference the error code against a severity matrix, query a depot for a fix code, and download and apply the fix code if the first component is configured, according to the severity matrix, to be autonomously repaired.

In still another embodiment, again by way of example only, a computer program product for autonomously diagnosing and repairing user-configured storage subsystem components in a storage environment is provided. The computer program product comprises computer-readable storage medium having computer-readable program code portions stored therein. The computer-readable program code portions include a first executable portion configured to monitor the user-configured storage subsystem components to identify an error associated with a first component of the user-configured storage subsystem components, the error corresponding to an error code, a second executable portion configured to cross reference the error code against a severity matrix, a third executable portion configured to query a depot for fix code, and a fourth executable portion configured to download and apply the fix code if the first component is configured, according to the severity matrix, to be autonomously repaired.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is an exemplary severity matrix;

FIG. 7 is an exemplary GUI depicting a second severity action configuration screen;

FIG. 8 is an exemplary GUI depicting a first frequency action configuration screen;

FIG. 13 is an exemplary GUI depicting a third error codes configuration screen.

DETAILED DESCRIPTION OF THE DRAWINGS

The present description and claimed subject matter describe exemplary system, method, and computer program product embodiments for autonomously diagnosing and repairing errors in storage components. These embodiments monitor the storage environment for errors. In one embodiment, storage environment logs and simple network management protocol (SNMP) traps are monitored for errors. The errors may have an associated error code to identify the type of error. These error codes may be tracked to generate a statistical record including such data as frequency of occurrence information.

Once an error/error code is identified by the system, the error/error code may be cross referenced against a "severity matrix" as will be further discussed. A severity matrix may be a table of information relating to the particular error code. For example, in one embodiment, the severity matrix may include a numerical value representing the severity of a particular error code to the storage environment. The severity matrix may be configured, modified, and updated in a variety of ways as will be further described.

In one embodiment, the system may query an external code/patch depot to determine whether the error is known to the depot and whether a "fix" or "patch" is available. Such a fix or patch will also be referred to throughout this specification as fix code. Upon finding no fix code available for the error, a request is submitted to the depot for a fix code. Upon finding an appropriate fix code for the error, the error code is downloaded. Then, if an authority of the autonomous method is configured for 'ACTION' for the impacted storage component, the fix code is applied concurrently and autonomously to the failing storage component and the user is notified. If the authority of the autonomous method is configured for 'NOTIFY' for the impacted storage component, the user is notified of the availability of the fix code. The autonomous diagnosis repair of storage components saves system administrator time and other resources. In addition, the autonomous diagnosis and repair reduces system downtime and/or increases system performance.

Figure 1A:
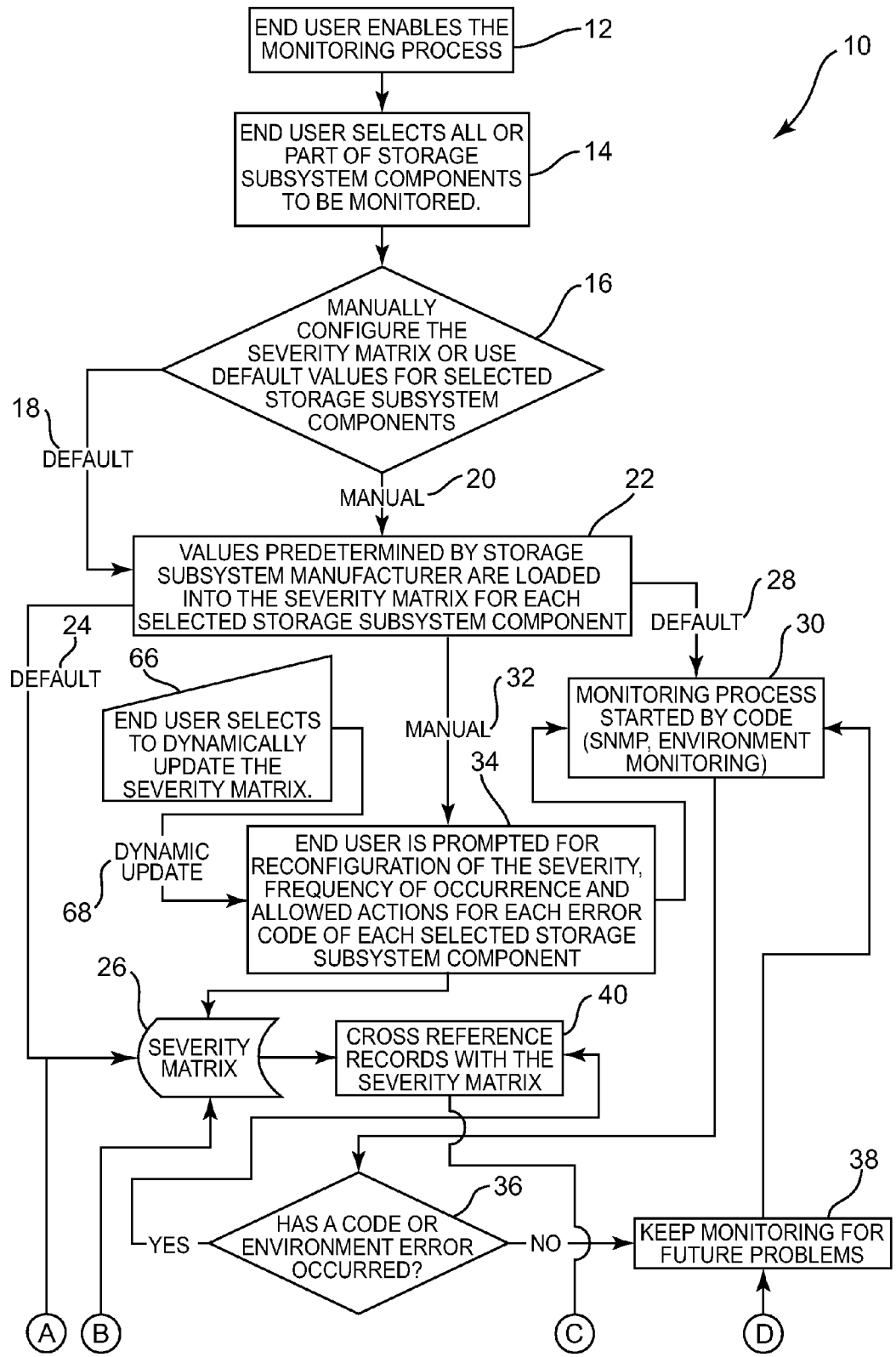
FIG. 1 is a flow chart diagram of an exemplary method for the autonomous diagnosis and repair of component errors in a storage environment.
Figure 1B:
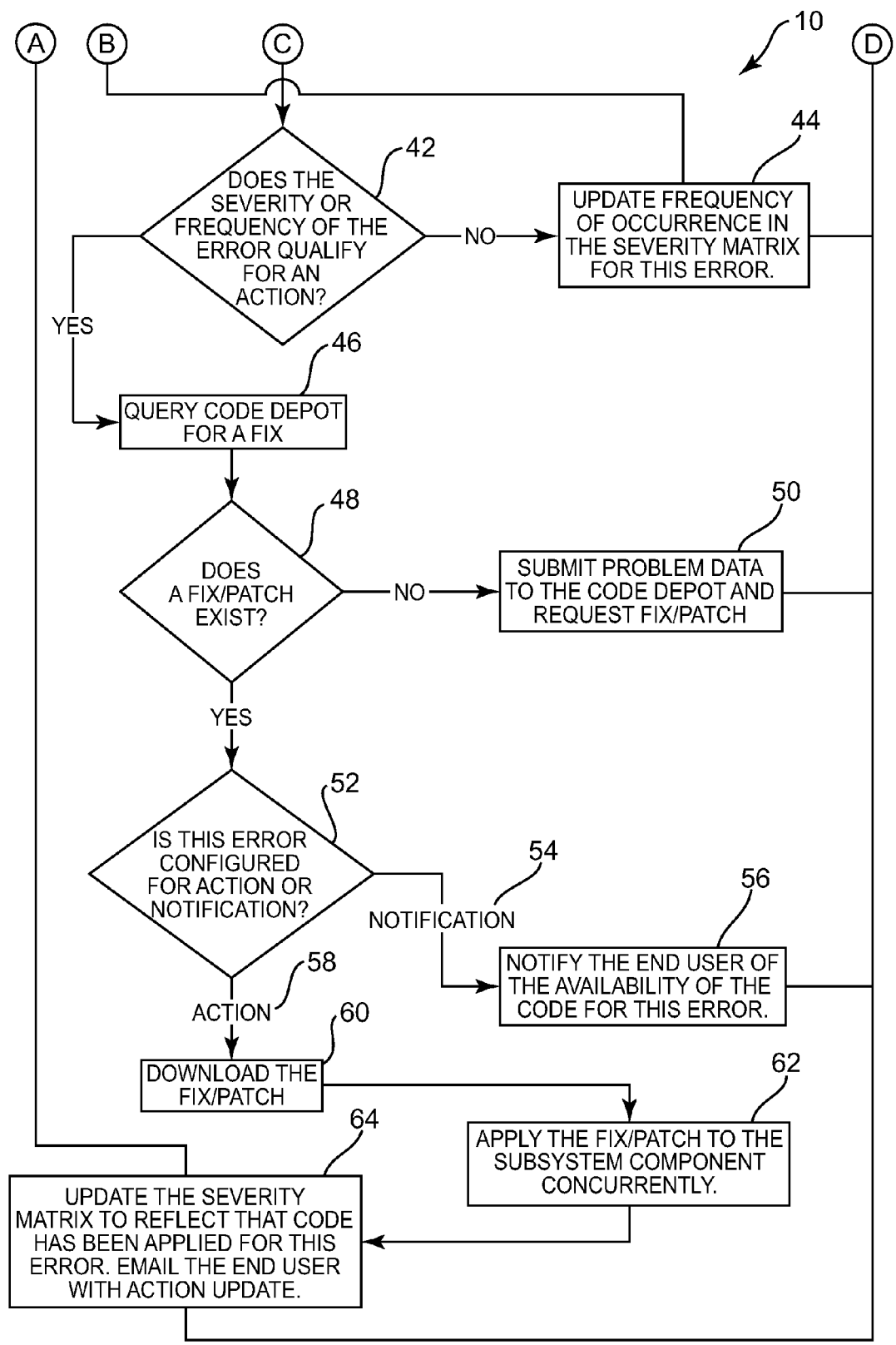

Turning to FIG. 1, an exemplary method 10 of autonomously diagnosing and repairing errors in storage components is illustrated. As one skilled in the art will appreciate, various steps in the method may be implemented in differing ways to suit a particular application. In addition, the described method may be implemented by various means, such as hardware, software, firmware, or a combination thereof operational on or otherwise associated with the storage environment. For example, the method 10 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 10 begins as an end user enables a monitoring process (step 12). The end user may select all or part of storage subsystem components (components making up the storage environment) to be monitored (step 14). Throughout the instant description of exemplary method 10, it will be seen that the method 10 allows for a user to configure various aspects of the monitoring, diagnosis, and repair functionality. A user need not manually configure each aspect of the method, however. As will be further seen, various default operations may be enabled by the user to allow the method 10 to become additionally autonomous.

For example, the method 10 may allow for a manual configuration of the severity matrix (represented by manual step 20), or the method 10 may allow for use of default values for selected storage subsystem components (decision 16). If a user selects all or a portion of the default values (represented by default step 18), then predetermined values are loaded into the severity matrix 26 for each selected storage subsystem component (step 22, default step 24). In one embodiment, these predetermined values may be supplied by storage subsystem component vendors and/or manufacturers. The predetermined values may include a numerical severity value assigned to a particular type of error. In one embodiment, the numerical value may vary between one (1) and four (4), with a severity value of (1) being the highest. For example, a particular error/error code may be assigned a predefined severity value of one (1), meaning that the error/error code is critical and requires immediate attention.

In addition, each storage subsystem component in the storage environment is assigned a value which indicates whether the storage subsystem component is configured for "action" (an action) or for "notify" (notification). A user has the flexibility to assign a specific configuration to a specific storage subsystem component. For example, a first storage subsystem component may be configured for an action. If the error is discovered, then the method 10 takes the appropriate measures (actions) to address the error. The specific action taken may be to download the fix code to the impacted storage subsystem component if the severity and frequency conditions identified in the severity matrix are met. In an additional example, a second storage component may be configured for notification. If the error is discovered, then the method 10 takes the appropriate measures to notify the user. The user then can implement fix code, if available.

Referring again to the exemplary embodiment depicted, if the user selects the default configuration (represented by default step 28), once the respective values are loaded into the security matrix for each selected storage subsystem component the monitoring process may be initiated, such as by the use of executing code (step 30). Again, this may include such activities as monitoring storage environment logs and/or SNMP traps for errors.

Again, however, the user has flexibility to assign all or a portion of the values loaded into the severity matrix herself (represented by manual step 32). In that case, the user may be prompted for configuration (or reconfiguration) data representing such values as severity, frequency of occurrence, and allowed actions for each error code of each selected storage subsystem component (step 34). An example detailing such a manual configuration step is further described below.

Once the monitoring process is initiated, the method 10 determines whether a code or other storage environment error has occurred (decision 36). If no, the method continues to monitor the storage environment for future problems (step 38). If an error/error code is identified, the error code is cross referenced against the severity matrix (step 40). For example, a particular error code may have an associated severity value of two (2).

As a result of cross referencing the error code against the severity matrix, the method 10 determines whether a value associated with the error code, such as a severity value or a frequency of occurrence value, qualifies the error code for an "action." An action is an affirmative step taken by the system to repair the error. If the method 10 determines that such an action is not necessary (e.g., the severity is low, or the frequency of occurrence is low) (decision 42), the respective frequency of occurrence information is updated in the severity matrix for the respective error/error code (step 44).

If the method 10 determines that an action is necessary (e.g., the severity or the frequency of occurrence is high) (again decision 42), the method queries a code depot for a fix, or fix code (step 46). As one skilled in the art will appreciate, the code depot may be located locally or remotely, accessed over a network, accessible over the internet, or may be located in more than one location. For example, a particular manufacturer may implement a code depot for part numbers under the manufacturer's responsibility. An additional manufacturer may implement a separate code depot elsewhere. Method 10 may query one or more of these code depot locations for information on fix code.

As a result of querying the code depot, if the method determines that a fix/patch (fix code) does not exist (decision 48), then the method 10 submits the problem data to the code depot as part of a request for appropriate fix code data (step 50). In one embodiment, the method then may continue to monitor the storage environment for future problems (again step 38).

If the method 10 determines that fix code does exist (again decision 48), the method queries whether the impacted storage subsystem component has been configured, according to the severity matrix, for an action or a notification, as previously described (decision 52). If the method determines that the impacted storage subsystem component has been configured for notification (represented by notification 54), then the user is notified of the availability of fix code to address the respective error (step 56). The method 10 then continues to monitor the storage environment for future problems (again step 38).

In the alternative, if the method 10 determines that the impacted storage subsystem component has been configured for an action (represented by action 58), then the method 10 downloads the fix code (step 60). The method 10 then applies the fix code to the storage component on a concurrent basis (step 62). The method 10 then updates the severity matrix to reflect that fix code has been applied for the specific error (step 64). In the depicted embodiment, the method 10 also emails the user with an update indicating the action(s) performed (again step 64). The method 10 then keeps monitoring the user configured storage subsystem components for future problems (again step 38).

Various steps of method 10 may be implemented through the use of a graphical user interface (GUI) presented to a user, for example, on a client computer connected to the storage environment. For example, the user may implement various configurations of the system using a GUI. FIGS. 2-13 illustrate various exemplary embodiments of GUI screens which may be presented to a user to implement various steps of the aforementioned method 10.

Figure 2:
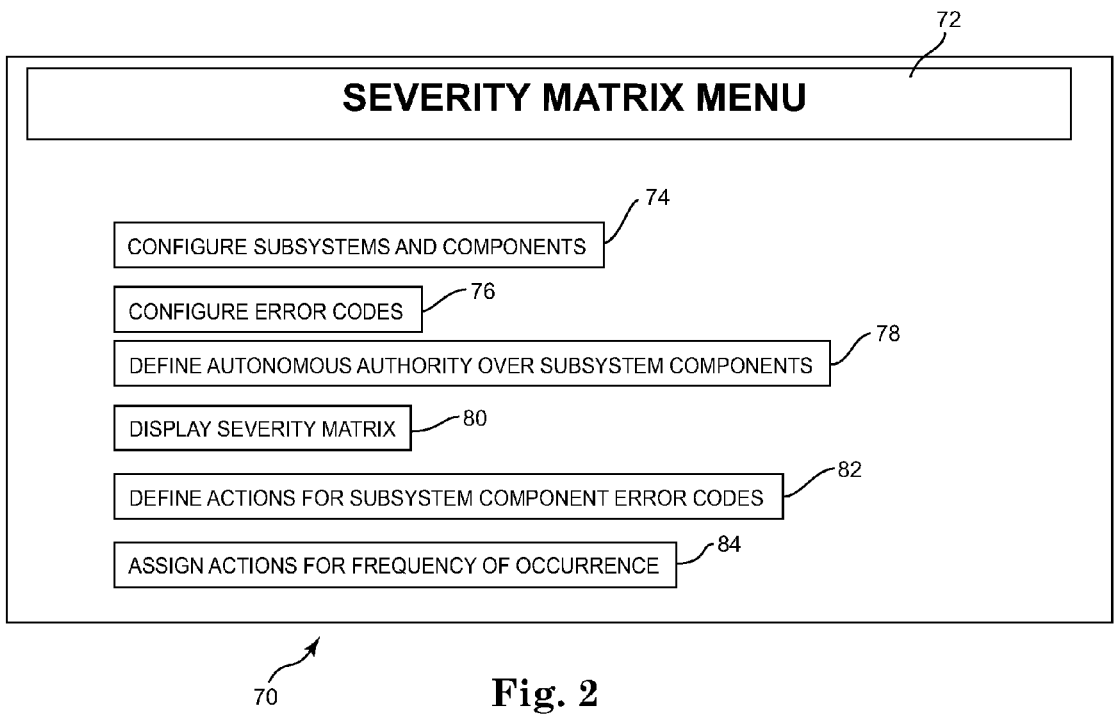
FIG. 2 is an exemplary graphical user interface (GUI) depicting a severity matrix menu screen.

FIG. 2 is an exemplary menu 70 presented to a user relating to various configuration options associated with the severity matrix. The severity matrix menu 72 displays various buttons implementing various severity matrix configuration functions. These functions include a configure subsystems and components function 74, a configure error codes function 76, a define autonomous authority over subsystem components function 78, a display severity matrix function 80, a define actions for subsystem component error codes function 82, and an assign actions for frequency of occurrence function 84. Each of these functions will be further described below in greater detail.

Depression of the display severity matrix 80 button may display an exemplary severity matrix 86 shown in FIG. 3. Severity matrix 86 includes columns relating to a particular storage subsystem 88, a configured authority 90 (notification or action), a particular subsystem component 92, a respective error code 94, a respective severity 96 (on a one to four scale), a frequency of occurrence 98, and a specific action 100. For example, a particular error code co98 (row 1) associated with a controller in a disk array is assigned a severity of two (2). If the error is discovered, the system will notify a user, as well as update the controller with new firmware if the firmware is available for the detected error. This various functionality will be further described below.

Figure 4:
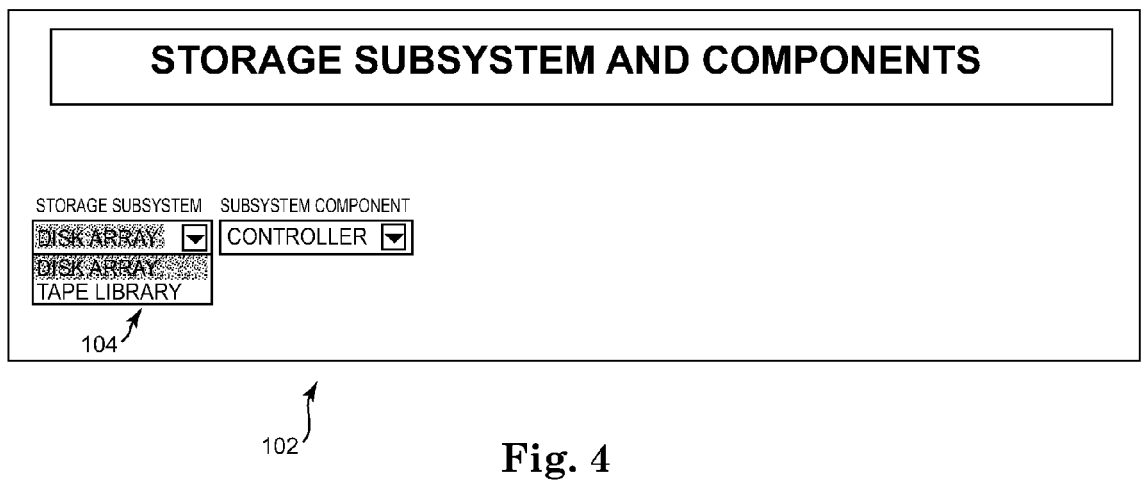
FIG. 4 is an exemplary GUI depicting a first storage subsystem and components configuration screen.
Figure 5:
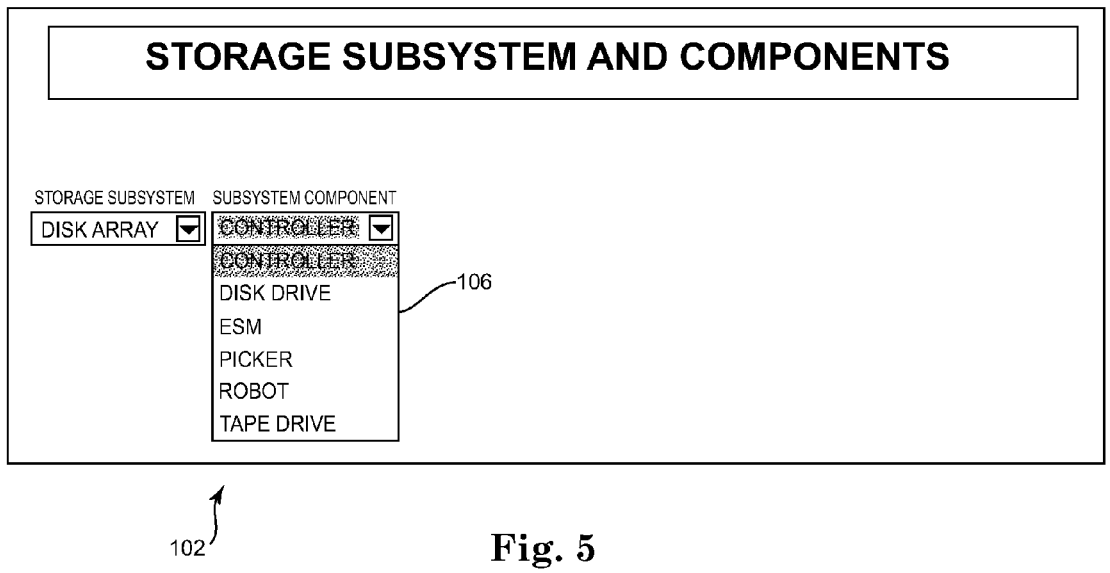
FIG. 5 is an exemplary GUI depicting a second storage subsystem and components configuration screen.

Depression of the configure subsystems and components 74 button (FIG. 2) may display an exemplary storage subsystem and components menu 102 shown in FIG. 4. The user may select from a drop down menu 104 of various types of storage subsystems, such as a disk array or a tape library to populate column 88 (FIG. 3) of the severity matrix. Turning to FIG. 5, the user may select from a drop down menu 106 of various types of subsystem components, such as a controller or disk drive to populate column 92 (FIG. 3) of the severity matrix.

Figure 6:
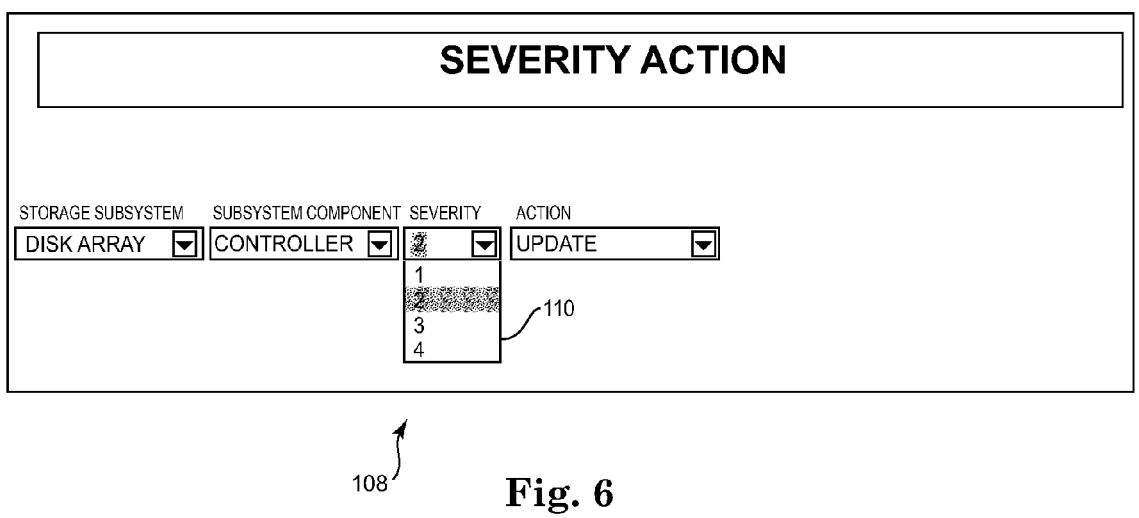
FIG. 6 is an exemplary GUI depicting a first severity action configuration screen.

FIG. 6 is an exemplary severity action menu 108, where a user may assign a particular severity value to a selected subsystem component using drop down menu 110. In the depicted embodiment, the severity values range from one (1) to four (4), with a severity of one (1) being the highest and requiring immediate attention. A severity value of two (2) may be critical, but does not impact access to data. Severity values of three (3) and four (4) are noncritical, requiring action only if a high frequency occurrence of the error is seen.

FIG. 7 again shows the exemplary severity action menu 108, with a user selecting a particular action using drop down menu 112. In the depicted embodiment, the user may select between "update" and "update if frequency exceeded." If "update" is selected, the system will update the subsystem component with fix code, such as new firmware, if the fix code is available for the error detected. If "update if frequency exceeded" is selected, the system will update the subsystem component with fix code if the fix code is available for the error detected and the assigned frequency of occurrence has been exceeded.

Figure 9:
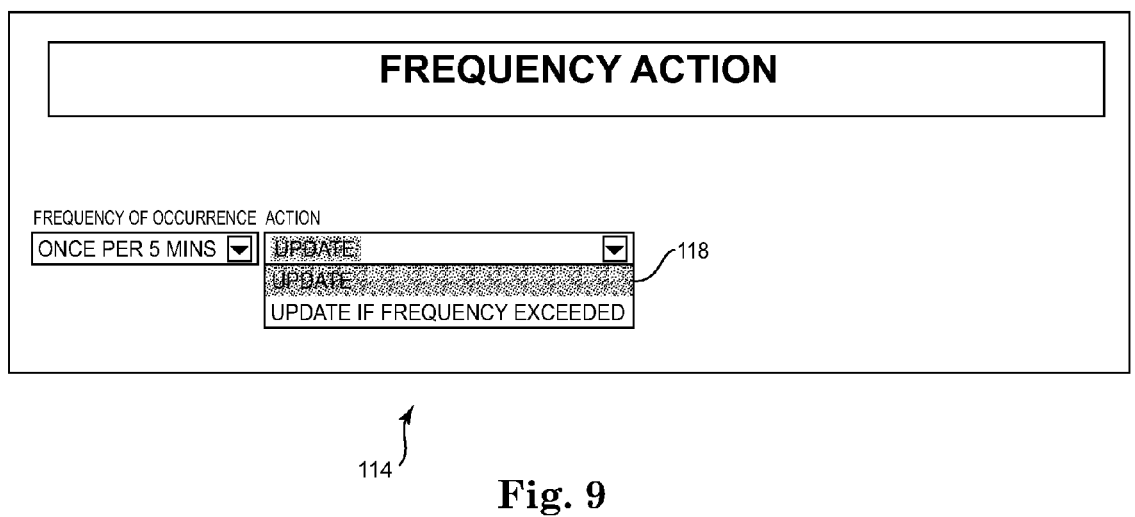
FIG. 9 is an exemplary GUI depicting a second frequency action configuration screen.

FIG. 8 depicts an exemplary frequency action menu 114, where a user selects various frequencies of occurrence for a particular error using drop down menu 116. In the depicted embodiment, the various frequencies of occurrence include once per 5 minutes, once per 1 hour, once per 4 hours, once per 24 hours, and once per week. The user then may select the respective action for the selected frequency of occurrence using drop down menu 118 (FIG. 9).

Figure 10:
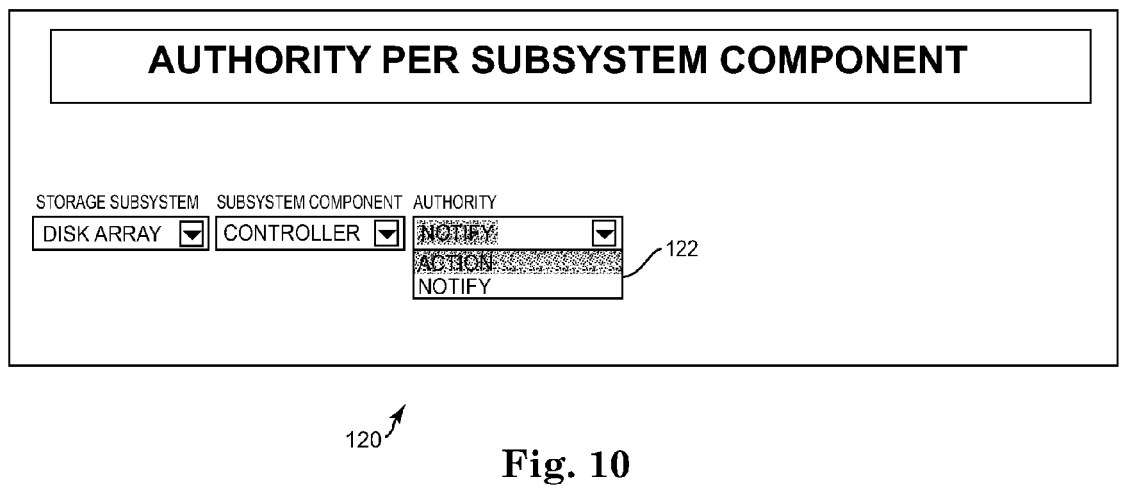
FIG. 10 is an exemplary GUI depicting an authority per subsystem component configuration screen.

FIG. 10 depicts an exemplary menu 120 to assign an authority for a particular subsystem component using drop down menu 122. In the depicted embodiment, the user may choose authorities "notify" or "action." If "action" is assigned, the system may download and apply fix code, such as update firmware, when the severity and/or frequency of occurrence level of the detected error indicate.

Figure 11:
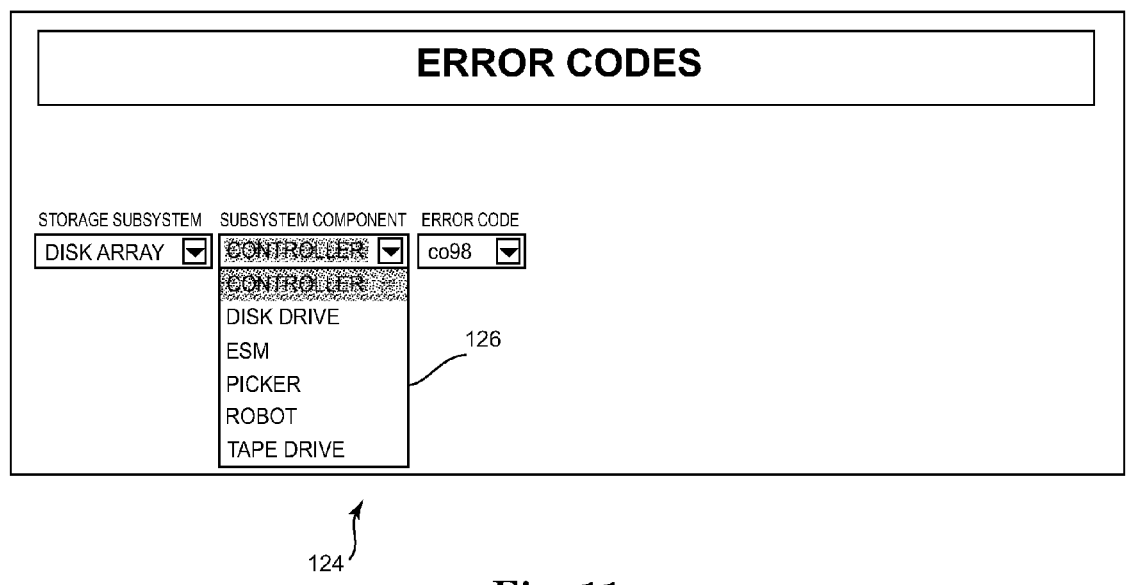
FIG. 11 is an exemplary GUI depicting a first error codes configuration screen.
Figure 12:
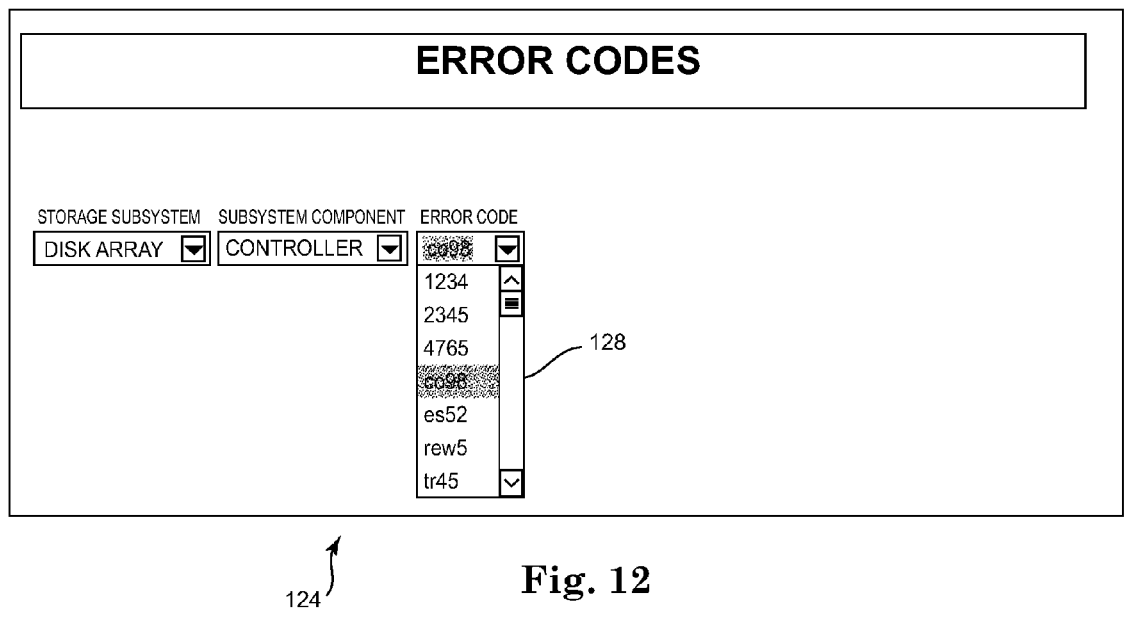
FIG. 12 is an exemplary GUI depicting a second error codes configuration screen.

FIGS. 11, 12, and 13 depict an exemplary menu 124 for configuring error codes. As previously described, each of the error codes correspond to a particular error which may be seen in the storage environment. A user may choose to associate error code co98 with a particular subsystem component, such as a controller, using drop down menu 126 (FIG. 11). The user may select error code co98 from a list of error codes using drop down menu 128 (FIG. 12). Finally, the user may choose the respective storage subsystem, such as a disk array, using drop down menu 130 (FIG. 13).

While FIGS. 2-13 describe various ways to configure a system to autonomously detect and address errors, those skilled in the art will appreciate that various additional menu functions, choices, actions, authorities, and the like are contemplated and may be implemented in a specific application.

Figure 14:
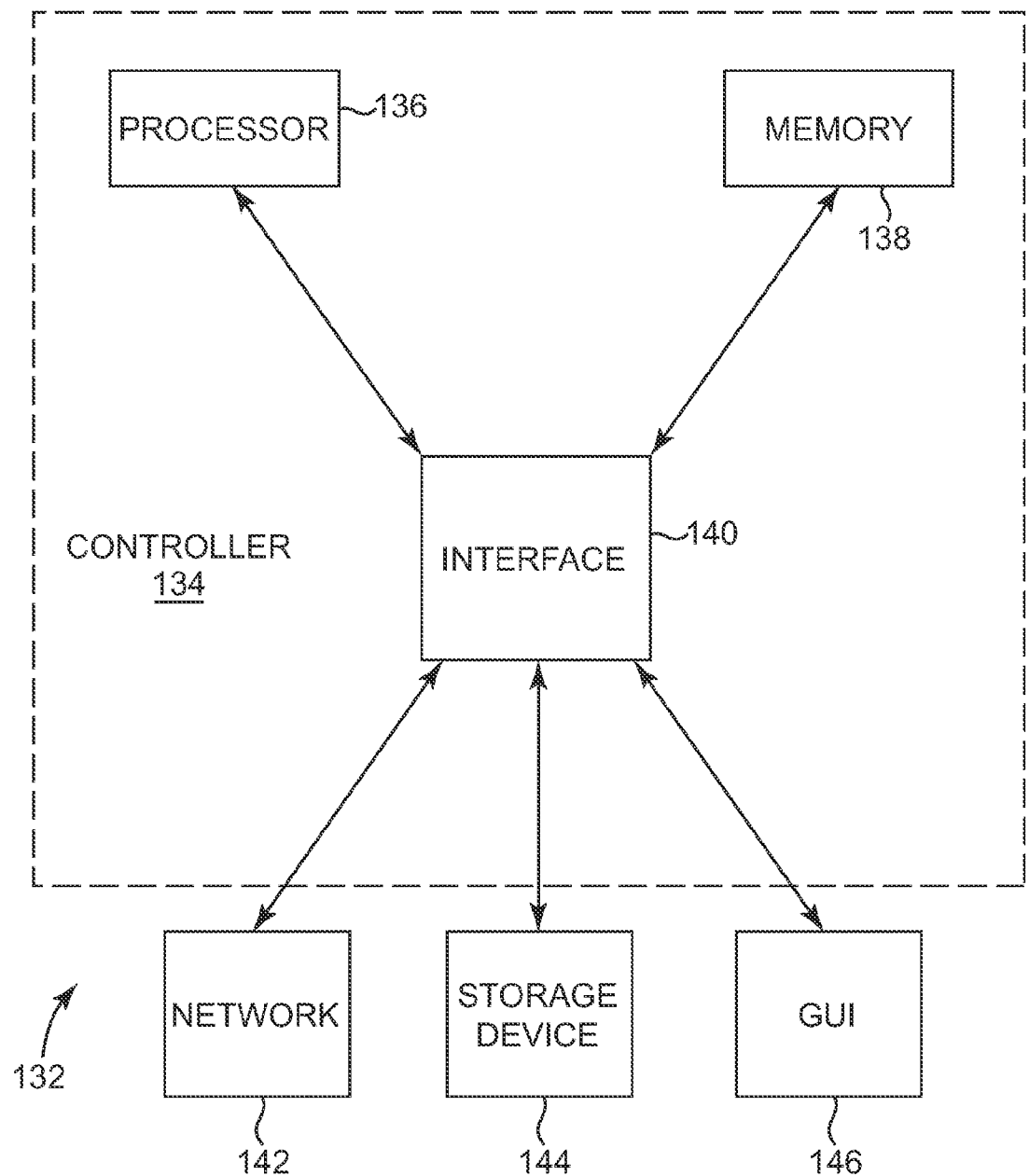
FIG. 14 is an exemplary controller of a storage environment in which aspects of the following description and claimed subject matter may be implemented.

FIG. 14 illustrates an exemplary hardware component 132 of a storage environment configured to perform various aspects of the foregoing description. A controller 134 includes a processor 136 for executing software instructions, a memory 138 for retrieving and storing the software instructions, and an interface 140 which connects the controller 134 to various user-configured storage subsystem components such as a storage device 144. Interface 140 is also coupled to a network 142 to connect to a depot for fix code, and a GUI 146 for displaying the various configuration screens previously described. As one skilled in the art will appreciate, controller 134 may be configured to perform various aspects of the previously described method 10 (FIG. 1)

In general, software and/or hardware to implement various embodiments of the present invention, or other functions previously described, such as previously described method 10 (FIG. 1), can be created using tools currently known in the art.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for the autonomous diagnosis and repair of user-configured storage subsystem components in a storage environment by a processor device, comprising:
    selecting, by the user, all or part of the storage subsystem components for configuration;
    configuring a severity matrix for the selected storage subsystem components, including:
        assigning each of the selected storage subsystem components, by the user, a default configuration value indicating whether the selected storage subsystem components are configured for one of an action and a notification, and
        loading a plurality of predetermined values including a numerical severity value assigned to one of a plurality of possible errors;
    monitoring the selected storage system components to identify at least one of the plurality of possible errors for at least one of the selected storage subsystem components, the at least one of the plurality of possible errors corresponding to an error code;
    cross referencing the error code against a severity matrix;
    querying a depot for a fix code; and
    if the configuration value of the at least one of the selected storage subsystem components indicates the at least one of the selected storage subsystem components is configured for an action, applying the fix code to the at least one of the plurality of possible errors to autonomously repair the at least one of the at least one of the selected storage subsystem components.

2. The method of claim 1, further including, if the fix code is not available, submitting data to the depot as a fix code request.

3. The method of claim 1, further including, if the configuration value of the at least one of the selected storage subsystem components indicates the at least one of the selected storage subsystem components is configured for a notification, notifying a user of an availability of the fix code.

4. The method of claim 1, further including, as a result of cross referencing the error code against the severity matrix, determining if a severity or frequency of the at least one of the plurality of possible errors qualifies the at least one of the plurality of possible errors for the action.

5. The method of claim 4, further including updating frequency of occurrence data in the severity matrix if the severity or frequency of the at least one of the plurality of possible errors does not qualify the at least one of the plurality of possible errors for the action.

6. The method of claim 1, further including, subsequent to applying the fix code, updating the severity matrix to reflect an application of the fix code to the at least one of the plurality of possible errors.

7. The method of claim 1, further including prompting a user to reconfigure the severity matrix based on at least one of a severity, frequency of occurrence, and an allowed action corresponding to the error code.

8. A system for the autonomous diagnosis and repair of user-configured storage subsystem components in a storage environment by a processor device, comprising:
    a controller coupled to a first component of the user-configured storage subsystem components, the controller configured to:
    selecting, by the user, all or part of the storage subsystem components for configuration;
    configuring a severity matrix for the selected storage subsystem components, including:
        assigning each of the selected storage subsystem components, by the user, a configuration value indicating whether the selected storage subsystem components are configured for one of an action and a notification, and
        loading a plurality of predetermined values including a numerical severity value assigned to one of a plurality of possible errors;
    monitoring the selected storage system components to identify at least one of the plurality of possible errors for at least one of the selected storage subsystem components, the at least one of the plurality of possible errors corresponding to an error code;
    cross referencing the error code against a severity matrix;
    querying a depot for a fix code; and
    if the configuration value of the at least one of the selected storage subsystem components indicates the at least one of the selected storage subsystem components is configured for an action, applying the fix code to the at least one of the plurality of possible errors to autonomously repair the at least one of the at least one of the selected storage subsystem components.

9. The system of claim 8, wherein the controller is further configured to submit problem data to the depot as a fix code request.

10. The system of claim 8, wherein the controller is further configured to, if the configuration value of the at least one of the selected storage subsystem components indicates the at least one of the selected storage subsystem components is configured for a notification, notify a user of an availability of the fix code.

11. The system of claim 8, wherein the controller is further configured to determine if a severity or frequency of the at least one of the plurality of possible errors qualifies the at least one of the plurality of possible errors for the action.

12. The system of claim 11, wherein the controller is further configured to update frequency of occurrence data in the severity matrix if the severity or frequency of the at least one of the plurality of possible errors does not qualify the at least one of the plurality of possible errors for the action.

13. The system of claim 8, wherein the controller is further configured to update the severity matrix to reflect an application of the fix code to the at least one of the plurality of possible errors.

14. The system of claim 8, wherein the controller is further configured to prompt a user to reconfigure the severity matrix based on at least one of a severity, frequency of occurrence, and an allowed action corresponding to the error code.

15. A computer program product for autonomously diagnosing and repairing user-configured storage subsystem components in a storage environment by a processor device, the computer program product comprising a computer-readable storage medium having computer-readable program code portions stored therein, the computer-readable program code portions comprising:

- a first executable portion configured to select, by the user, all or part of the storage subsystem components for configuration;
- a second executable portion configured to configure a severity matrix for the selected storage subsystem components, including:
  - assigning each of the selected storage subsystem components, by the user, a configuration value indicating whether the selected storage subsystem components are configured for one of an action and a notification, and
  - loading a plurality of predetermined values including a numerical severity value assigned to one of a plurality of possible errors;
- a third executable portion configured to monitor the selected storage system components to identify at least one of the plurality of possible errors for at least one of the selected storage subsystem components, the at least one of the plurality of possible errors corresponding to an error code;
- a fourth executable portion configured to cross referencing the error code against a severity matrix;
- a fifth executable portion configured to query a depot for a fix code; and
- a sixth executable portion configured to, if the configuration value of the at least one of the selected storage subsystem components indicates the at least one of the selected storage subsystem components is configured for an action, apply the fix code to the at least one of the plurality of possible errors to autonomously repair the at least one of the at least one of the selected storage subsystem components.

16. The computer program product of claim 15, further including a seventh executable portion configured to, if the error code is not available, submit problem data to the code depot in a fix code request.

17. The computer program product of claim 15, further including a seventh executable portion configured to, if the configuration value of the at least one of the selected storage subsystem components indicates the at least one of the selected storage subsystem components is configured for a notification, notify a user of an availability of the fix code.

18. The computer program product of claim 15, further including a seventh executable portion configured to update the severity matrix to reflect an application of the fix code to the at least one of the plurality of possible errors.

* * * * *